March 31, 1970 R. E. LAKE ET AL 3,504,214

ELECTROLUMINESCENT DISPLAY DEVICE

Filed Sept. 28, 1967

WITNESSES:

Leon M. Garman

James F. Young

INVENTORS
Royston E. Lake
Gary R. Cox
Colin West

BY Charles F. Renz

ATTORNEY 3,504,214

ELECTROLUMINESCENT DISPLAY DEVICE

Royston E. Lake, Dundas, Ontario, and Gary R. Cox and Colin West, Burlington, Ontario, Canada, assignors to Canadian Westinghouse Company Limited, Hamilton, Ontario, Canada Filed Sept. 28, 1967, Ser. No. 671,273
Claims priority, application Canada, Jan. 13, 1967, 980,247
Int. Cl. H01j 1/62, 63/04
U.S. Cl. 313—108 6 Claims

ABSTRACT OF THE DISCLOSURE

An improved electroluminescent display device comprising a photoconductive optical input and an electroluminescent optical output. One feature is an improved contrast of the display. Electrical connection between the photoconductive layer and electroluminescent layer is provided through apertures in a supporting glass sheet. A second feature is an improved through-hole connection including a conductive coating on the walls of the aperture and an inert filler. A third feature is an improved separating layer provided between the storage electroluminescent layer and the display electroluminescent layer. The separating layer includes a mosaic of reflective, conductive material with an opaque, insulating material of low dielectric constant filling the remaining spaces in the separating layer.

BACKGROUND OF THE INVENTION

This invention relates to display devices having storage or switching utilizing a photoconductive optical input and an electroluminescent optical output.

In the previous art of electroluminescent storage and display devices, the consistently used means of increasing visibility was to increase the light output of the activated phosphor layer. In this invention, the light output is decreased but the contrast increased to thereby improve legibility.

Contrast, defined as the ratio of total radiant light at the emitting display surface to the reflected light at adjacent non-emitting areas can be improved by either decreasing ambient light in the vicinity of the radiant display, by increasing the output of the radiant light or by reducing reflectivity of the display surface. In the present application the improvement in contrast is accomplished by use of a selective color filtering, neutral density filters and/or anti-reflective cover glasses. A selective color filter, having a color transmission curve matching as closely as possible the phosphor emission curve is incorporated in the phosphor layer of dielectric material. The filter preferentially absorbs wave-lengths outside the transmission band. Ordinary ambient light has a distribution of wavelengths. Thus by absorbing the major proportion of these wavelengths the ratio of electroluminescent light to reflected ambient light is greatly enhanced. This ratio controls the contrast and thereby the legibility of a phosphor activated display.

Since a selective color filter preferentially attenuates wavelengths the filter will impart a colored background substantially the same color as the radiant light source. By allowing the selectively attenuated reflected ambient light to pass through a neutral density filter, this attenuation of the reflected light can appear as a color change to the viewer without importing any similar effects to the light from the radiant source. The apparent color shift, by attenuation, creates color contrast between the emitting display surface and the reflected light at the adjacent, non-emitting areas and thus improves legibility.

In the art of light switching, storage and readout devices many intricate patterns and complex constructions have been postulated. Most of these devices were not economical and did not provide a low cost method of manufacturing. As light switching and storage displays became more complex two methods of construction were developed. The first method was the addition of the layers to one side of a glass substrate. As the layers became more numerous, complicated and thicker, the device became more difficult to manufacture. The second method described in U.S. Patent 2,920,232 by H. J. Evans, is to apply layers to both sides of a glass substrate in specific areas where glass had been etched away to form individual cells and patterns utilizing through-hole electrical connections. The patent by Evans amply demonstrates the problems encountered in the prior art which the present invention overcomes. These problems are:

(1) The undesirable switching on of the display by high labels of ambient light entering from the readout side of the panel.

(2) The possibility of electrical breakdown in the dielectric sublayer due to thinning of dielectric sublayer around the edge of the vacancies in the glass substrate.

(3) Complexity of structure which does not easily lend itself to a simple economical method of manufacture.

In the preparation of a light emitting device, it is advantageous to make electrical connections to small physically isolated electrode areas on an insulating main substrate. A method much favored for providing these electrical connections to the insulated electrode area, is an electrical through-hole connection from the rear of the panel through the substrate to a required circuit component. Through-hole connections can be made by filling a hole with a suitable electrically conductive compound or mixture, such as a conductive epoxy resin, but where large number of through-hole connections are employed and particularly where thin film electroluminescent material has to be activated on a substrate, the use of a conductor is undesirable due to the possibility of interaction of the conductive resin with the phosphor/electrode structure. In such cases the through-hole electrical connections are formed by the vapor deposition of tin oxide or other conductive films.

In this invention an improved through-hole electrical connection is manufactured by filling the remaining hole after deposition of the conductor with an inert hole filler and overlapping the through-hole connector where necessary with light reflective conductor.

An electroluminescent storage-readout display consists of two electroluminescent layers back to back with three electrodes in which one of the electrodes of each cell is common. Usually the rear electrode of the readout side is segmented to form a character. By activation of suitable segments the panel is made to display characters of various types. The bistable switching of the segments is achieved by a series of switches in the power supply and in the instant application the switch takes the form of a photoconductive light sensitive element which is actuated by an external light emitting element. These light emitting elements form part of a trigger or information storage system backing the display panel.

A requirement of the construction of such a storage readout display is that the storage section must be insensitive to ambient light, failing this, the display could be viewed only in the dark or in a very low ambient light level. If unwanted segments of the display are not to be triggered by ambient light penetrating from the front of the panel to the photoconductor switches, an opaque layer must be provided between the photoconductive control elements and the readout side or front of the panel.

The improved opaque layer of this invention comprises two distinct parts, the reflective rear electrodes of the read-out device and an opaque insulator of low dielectric constant.

In the prior art relative to opaque layers in electroluminescent panels, aluminum has been used as the rear electrodes of electroluminescent lamps but in storage/readout displays metallic oxide insulators have been used for the same purpose. If the metallic oxide layer was sufficiently thin, voltage could be transferred across it by a capacitive effect and still screen out ambient light. A feature of the fragmented aluminum layer of this invention is that it reflects the light from both electroluminescent layers in the direction in which that particular light was intended to go. Now substantially all the light from the feedback electroluminescent layer reaches the photoconductive control element thereby easing the design requirements of the photoconductive material. By using a good conductor in contrast to an oxide insulator one does not lose voltage and therefore brightness is higher, also a conductor provides a redistribution of voltages between the electroluminescent layers which creates a more uniform brightness. Since the segment of a character are the aluminum electrodes, the two previous mentioned effects creates better character definition and less sideways spreading.

In accordance with this invention the other portion of the opaque layer is an opaque insulator of a black screen epoxy. In the previous art lacquers, black glass and black rubber have been used to prevent penetration of unwanted radiation and ambient light. The opaque insulator must have the following characteristics to be compatible with an electroluminescent storage display panel;

(1) high optical opacity in thin layers
(2) high electrical resistance,
(3) resistance to the solvents used in application of the electroluminescent/binder layers and
(4) a low dielectric constant A black epoxy can satisfy these requirements. The epoxy must have a very high resistance since it is the insulator that separates one aluminum cell, segment or electrode from another. Also the epoxy separates the storage or feedback electroluminescent layer from the readout electroluminescent layer similar to the aluminum segements. For the epoxy to be effectively opaque it must be consideraly thicker than the aluminum segment, therefore the electroluminescent readout layer above the epoxy is thinner than that above the aluminum segments if the electroluminescent material is bladed on. In operation, a voltage is applied across the combined electroluminescent layers. The voltage required to make an electroluminescent layer luminesce at a given brightness level is proportional to the thickness of the layer, thus making the combined electroluminescent regions above and below the epoxy very sensitive to voltage. A capacitive coupling through the epoxy could cause the overlaying electroluminescent region to luminesce. Therefore one of the requirements of the epoxy is a very low dielectric constant in order to reduce capacitive coupling. The final required characteristic of the epoxy is resistance to the solvents used in the application of the electroluminescent layers.

DESCRIPTION OF THE PREFERRED EMBODIMENTS

Figure 1:
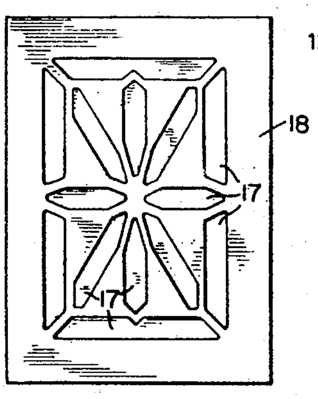
FIGURE 1 is a plan view of an illuminated storage readout display incorporating the teachings of this invention.
Figure 2:
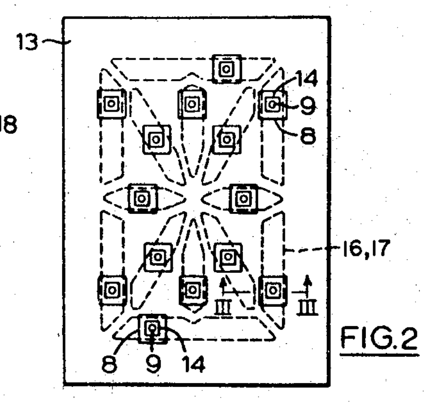
FIG. 2 is a plan view of the display non-illuminated shown in FIG. 1.
Figure 3:
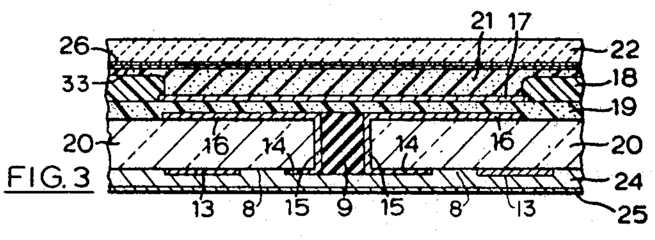
FIG. 3 is a partial sectional view of the storage readout display taken along line III—III of FIG. 2.

Referring to FIGS 1, 2 and 3 there is illustrated a combined readout-storage panel constructed on a single substrate 20 of a suitable material such as glass. The substrate 20 is provided with a common terminal 13, a terminal pad 14, through-hole conductors 15, rear electrode 16 and a hole filler 9. The switching gap 8 between the two terminals 13 and 14 is bridged by suitable photoconductive layer 24. The rear electrode 16 of a suitable material such as tin oxide is deposited in a predetermined shape to form the segments of the display. A coating 19 of a suitable electroluminescent material is deposited over the rear electrode 16 and the surface of substrate 20 located between the segment 16. Segments 17 are deposited on the coating 19 to form segments of display and are identical in shape and size to the segments 16 and aligned therewith. Segments 17 are the common "floating" electrode of the readout. The rear or storage electroluminescent layer 19, creates the light feedback to the photoconductive layer 24. Separating the aluminum segments 17 of the fragmental layer is the opaque insulator 18. Deposited over the fragmentary layer consisting of the opaque insulator 18 and the aluminum segment 17, is the front or display electroluminescent layer 21 which when activated radiates the readout light. Incorporated into the phosphor sublayer and dielectric sublayers of the layer 21 is a dye which acts as a selective color filter. To complete the electrical circuit a transparent front eletrode 33 is deposited over the front electroluminescent layer 21. Over this is a non-reflective glass cover 22 with a neutral density filter 26 deposited on the inner surface of the non-reflective glass 22. Finally there is provided a back cover 25 over the layer 24 which is transparent in order to allow triggering light to be directed onto the photoconductive layer control 24.

Figure 4:
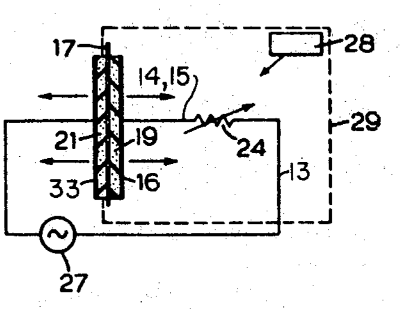
FIG. 4 is a schematic view of the functional parts of the readout display device shown in FIGS. 1, 2 and 3.

An electrical circuit for operating an individual cell or segment is shown in FIGURE 4. Connected in series are the following electrical elements; an alternating voltage source 27, the photoconductive layer 24, the transparent rear electrode 16, the rear electroluminescent light feedback layer 19 the front electroluminescent readout layer 21 and the transparent front conductive electrode 33. Other essential elements of the display are; a light-tight "box" 29 with the aluminum layer 17 facing out, a light emitting triggering element 28 within the light-tight "box" 29 to actuate the photoconductive layer 24. Initially the storage device is triggered on by applying a light pulse from source 28 to the photoconductive layer 24. Due to the presence of the light pulse the resistance of the photoconductive material bridging the switching gap 8 reduces rapidly, allowing a larger voltage to appear across the combined electroluminescent layers 19 and 21. This voltage is sufficient to activate the electroluminescent layers 19 and 21. Feedback light from the rear or storage electroluminescent layer 19 is directed through the transparent rear electrode 16 back to the photoconductive control layer 24 directly and by reflection off the layer 17, latching the photoconductive control layer 24 on. Radiant light from the front or display electroluminescent layer 21 is radiated through the transparent front electrodes 33 in the read out direction directly and again by reflection off the layer 17. This describes the operation of only one unit, cell or segment of a readout storage display. In a particular readout storage display there will be many such cells or segments located on one panel, separation of these cells or segments from each other is one of the functions of the opaque insulator 18.

The opaque insulator 18 is located between the aluminum segments 17, as shown in FIG. 1, such that it is overlapping the aluminum slightly. If such a cell is to operate in high ambient light levels the aluminum and the opaque insulator must both be opaque to prevent ambient light penetrating to the photoconductive control layer 24. Not only must the opaque insulator 18 prevent electrical leakage from one aluminum segment 17 to another but it must also have a low dielectric constant for reasons previously discussed.

A black screen epoxy has been developed, which has the required characteristics, using 75% by wt. of a commercial clear thermoset epoxy and 25% of a commercial carbon pigmented epoxy. The epoxy mix, is easily screened, exhibits excellent adhesion to a glass, required no added catalyst in manufacture and is heat treated in a relatively short time, for example 7 minutes at 180° C.; 1 hour at 120° C. The light transmission of a one mil layer (standard screened layer) can be made less than 1%. Electrically the conductance of the layer is very low, approximately $10^{-11}$ mhos/sq. at 100 volts, also its dielectric constant is low. Chemically the epoxy is resistant to the solvents used in the electroluminescent layer applied over it.

Figure 5:
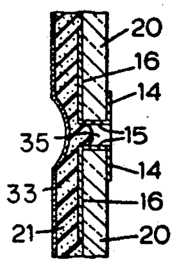
FIG. 5 PRIOR ART
FIG. 5 is a sectional view of through-hole connections of a simple electroluminescent panel of the prior art.

FIG. 5 representing the prior art shows a through-hole connection to an electroluminescent element as disclosed. A glass or ceramic substrate 20 has an appropriate passage 35 defining a hole formed through it. A thin conductive film is then deposited to form the through-hole conductor 15, terminal pad 14, terminal 13 and rear electrode 16. An electroluminescent layer 21, and its transparent conductor 33 can now be applied over the rear electrode 16. Unless the passage 35 has been filled before the application of the electroluminescent layer 21 it will cause drainage of the slurry of applied material. A dark spot due to the presence of the passage 35 will appear when the electroluminescent layer is activated, also electrical breakdown may occur due to the thinning of the dielectric material at the edge of the passage.

Figure 6:
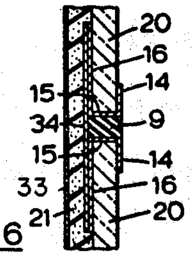
FIG. 6 is a sectional view of a simple electroluminescent panel in accordance with the present invention.

These difficulties are avoided if after deposition of the tin oxide the passage 35, or passages are physically plugged with an inert material 9 and a thin aluminum or metallic film 34 is deposited over the passage 35 and the rear electrode 16 as shown in FIG. 6. Filling the passage with an inert hole filler 9 allows deposition of a smooth unbroken layer over the passage on either side of the substrate 20. By the application of the aluminum layer 34, the black spot on the activated layer can be eliminated if it is objectionable. The aluminum layer 34 allows a redistribution of potential across the filled hole thereby allowing the electroluminescent material above the filled passage to luminesce, also the aluminum layer 34 is a reflector reflecting the light in the readout direction, and is the back electrode of the electroluminescent device. After the hole has been filled an electroluminescent layer 21 can be deposited in a smooth unbroken layer over the surface of the substrate 20 so eliminating the possibility of the thin layer thinning at the hole edge. Such a layer as is shown in FIG. 6 will not have the objectionable black spot.

In the filling of the conductive holes a paste is employed containing a chemically inert organic filler dispersed in a suitable evaporable organic liquid. An excess of the paste is placed at one end of the substrate and a squeege is drawn over the surface to force the paste smoothly and evenly into the passages 35. The substrate is then baked to a suitable temperature to evaporate the solvent leaving the passages 35 filled with a tightly packed powder and leaving a smooth surface.

The material 9 used as the inorganic powder for passage filling must have the following characteristics. It must be suitably fine to be cohesive in the passages and it must not react with either phosphors, plastic, or electrode materials employed in the fabrication of the panel. The same is true of the solvents used to form the slurry. An excellent paste results if a fine grade of titanium dioxide is mixed with methanol. This mixture also has the advantage of being compatible with thin film photoconductive and other material which are used in solid state displays.

The manufacturing method employed in this display device is a major economic improvement over prior methods. The manufacturing process begins with and centers around a single substrate 20, in this case glass. The locations of the through-hole connectors are determined by design consideration as will be discussed and etched through by an applicable method known in the relevant art. Then the through-hole conductor 15, the windowed layer consisting of terminal pad 14, and common terminal 13, and rear electrode 16 are vapor deposited in a predetermined pattern onto the substrate 20. Once the substrate has the required patterns of tin oxide on both sides and through the passages, the passages are filled with an inert hole filler and baked as previously described.

Next photoconductive material is applied either specifically to the switching gap 8, between the rear terminal 13 and the rear terminal pad 14 of the through-hole conductor 15 or generally to the rear of the panel, completely covering the panel with a layer of phoconductive material 24 such as CdS.

The photoconductive material used must have electro-optical characteristics, such as dark resistance and light sensitivity, matched to the requirements of the particular design of the device. For example in an application requiring a large number of segments on the readout side of the panel the physical location of one photoconductive switching gap 8 to another is determined by the light sensitivity of the photoconductive material in conjunction with scattered light reaching the active photoconductive area—i.e. optical crosstalk—from adjacent electroluminescent segments. The dark resistance and the width of the switching gap 8 are determined such that the voltage across the combined electroluminescent layers is below that voltage required for them to luminesce at such intensity as to cause actuation of the storage photoconductive switch. If these properties are optimized, no significant cross-coupling will occur between excited and unexcited elements, and the device will function reliably. After deposition of the photoconductive layer 24 on the rear of the substrate 20, a thin sublayer of phosphor powder in a clear plastic binder without a dye is applied completely over the front of the substrate 20. Then a clear high dielectric sublayer is applied over the phosphor sublayer, these two sublayers comprise the electroluminescent layer 19 as shown in FIG. 3.

Next, aluminum segment 17, is vacuum deposited through a mask onto the phosphor directly above the tin oxide electrode segments on the glass. This aluminum layer 17 is made sufficiently thick to be highly reflective, completely opaque, and relatively impermeable to the organic solvents used in the phosphor plastic suspensions. Actually this thickness is not critical provided it is sucient to meet these requirements.

The black screen epoxy resin 18, previously described, is now screened over the electroluminescent layer 19 to cover everything except the aluminum segments 17, with a slight overlap between the aluminum 17 and the epoxy 18 to eliminate all possibility of ambient light reaching the photoconductive control layer.

In the second electroluminescent layer 21 a typical green dye is introduced into the phosphor/plastic sublayer and into the clear dielectric sublayer. This green dye achieves a selective absorption of wavelengths in ambient white light incident on the panel, while minimizing the absorption of green light emitted by the activated phosphor of the electroluminescent panel. This relative decrease of ambient light over the phosphor light, increases the contrast—and thereby the legibility—of the display allowing the panel to be readable in high levels of ambient light. Suitable dyes are chosen by matching the spectral transmission of the dyes to the spectral emission characteristic of the phosphor. A typical solution of a 50:50 mixture of yellow and blue anilin dyes may be used to produce a light transmission characteristic closely matching the light emission curve of the phosphor used in this panel. This solution is used in dying the electroluminescent layer 21 of the high contrast display panel.

An appropriate proportion of dye to solid in the electroluminescent layer is 0.0023 gm. dye/gm. solid for the phosphor sublayer and 0.016 gm. dye/gm. solid for the clear coat dielectric sublayer.

The electroluminescent layer 21 with its color filter is applied over the epoxy 18 and aluminum segments 17 such that the combined thickness of the electroluminescent layer 21 above the aluminum, and that of the rear electroluminescent layer 19, is the total thickness required by design consideration for operation at a prescribed voltage and frequency. Although the total thickness of the combined electroluminescent layers is constant for a particular device, the relative thickness of either layer can be varied in accordance with the feedback light required and the readout brightness required. The division of light output for either feedback or readout determines the relative thickness of the electroluminescent layers.

To complete the electrical circuit a transparent electrode 33 is evaporated over the phosphor layer 21, and an electrical connection (not shown) is brought out from this layer 33.

The front electrode 33 can function as an electrode and a neutral density filter. In the preparation of the transparent front electrode 33 gold and bismuth oxide are evaporated in a vacuum chamber so that they deposit on the substrate facing the source. First 12 mg. of bismuth oxide, is evaporated over 180° solid angle at a source to substrate means distance of about 13 inches. This is followed by the evaporation of sufficient gold to give a resistance of 100 ohms per square. Films produced in this manner can have a light yellow brown color and an optical transmission of about 80%. By approximately doubling the $Bi_2O_3$ to 20 mg. a much darker film can be produced having optical transmission of about 60%. These dark films have found useful applications in high contrast panels since the resultant dark surface creates a color and brightness contrast between it and the radiant green light. It is obvious to one skilled in the art relating to vacuum chambers that there is limitations on the source to substrate distance if a consistent thin film is to be obtained.

The panel is then vacuum sealed with a cover glass and epoxy or other adhesive. In this particular embodiment of the invention rear seal 25 is glass or transparent epoxy, the front seal 22 is non-reflective glass with a thin neutral density filter 26 evaporated on the inner surface. The anti-reflective glass adds rigidity and strength to the complete panel assembly.

Prior to the final sealing, the neutral density filter 26 is formed by vacuum evaporating aluminum onto the inner surface of a cover glass 22, to give a monitored resistance of 1000 to 2000 ohms per square. This step is followed immediately by the evaporation of a gold film to give a monitored resistance of 200 ohms per square. Films prepared in this way are gray in color when viewed by reflected light and are extremely unstable electrically. This is demonstrated by the fact that their resistance rises sharply soon after film deposition and particularly after exposure to air. The optical transmission of the film increases only slightly with age, probably due to oxidation of aluminum or an aluminum/gold reaction, but this change is not sufficient to reduce their usefulness as natural density filters.

By use of these high contrast techniques the legibility of electroluminescent displays viewed in fairly high ambient light levels has been greatly improved. This improvement in contrast, while it achieves greater legibility of the panel message, also cuts down the total light output. The reflectivity of a high contrast panel can now be reduced to about 2.5% from the previous 50%, a factor of 20 to 1. Corresponding loss in light output of the panel is only approximately 5 to 1, leading to a net gain in the legibility.

Such a combined readout storage device will have the advantage of being a lower priced unit than the two panel construction necesary for individual readout and storage.

This construction must always suffer the slight disadvantage that the voltage on the radiant side of the storage device, and so its brightness, cannot be altered independently of that of the storage or feedback layer. However, for the optimization of performance of any particular device, the ratio of forward light emitted to light feedback from the two electroluminescent layers can be changed, at a constant overall applied voltage, by varying the relative thickness of the layers on each side of the aluminum segment.

The particular display device as shown in FIG. 3 can readily be altered to a simple switching device by simply eliminating the rear or storage electroluminescent layer 19 and the techniques developed for manufacturing are directly applicable to display panels utilizing small size individual cell construction to increase information density.

While the invention has been described in connection with preferred embodiments it will be understood that it is not intended to be limited to particular embodiments illustrated but is intended to cover all alternatives and equivalent construction falling within the spirit and scope of appended claims.

What is claimed is:

1. An electroluminescent display device comprising a main substrate of insulating material having a first and second surface with a passage located substantially perpendicular to and joining said surfaces, through-hole electrical connectors provided in said passages, said through-hole connectors comprising electrically conductive coatings on the walls of said passages and the remaining space in said passages filled with an inert material, a first coating of electrical conductive material provided on said first surface of said substrate comprising a common terminal coating and a plurality of terminal pads separated from said terminal coating, each of said terminal pads being located at a passage and connected to said through-hole electrical connector, a photoconductive layer deposited over said non-continuous coating, a second electrical conductive coating provided on the second surface of said substrate comprising a predetermined pattern of one or more segments with each segment electrically connected to at least one of said terminal pads via said through-hole connector, an electroluminescent layer deposited over said second electrical conductive coating, a third electrical conductive coating on said electroluminescent layer deposited in substantially the same pattern and coincident with said second electrical coating.

2. The device defined in claim 1 in which said electrical conductive coating provided over said second surface also extends over said passages and is supported by said inert filling material in said passages.

3. The device defined in claim 1 in which the portion of the surface of said electroluminescent layer not covered by said third conductive coating pattern is coated with an insulating material coating of low dielectric constant, a second electroluminescent coating is deposited over said third conductive coating and said insulating material coating and a fourth conductive coating over said second electroluminescent coating.

4. The device defined in claim 3 in which said third conductive coating is reflective to radiation and said insulating layer is opaque to radiation.

5. The device defined in claim 3 in which said third conductive coating is aluminum sufficiently thick to be reflective and said insulating material coating is a black epoxy overlapping the edges of said third conductive coating.

6. The device defined in claim 3 in which said insulating material is a black epoxy comprising about 75% clear thermoset epoxy and about 25% carbon pigmented epoxy.

References Cited

UNITED STATES PATENTS

| | | | |
|---|---|---|---|
| 2,920,232 | 1/1960 | Evans | 313—108 X |
| 2,970,239 | 1/1961 | Riggen | 313—108 |
| 3,010,043 | 11/1961 | Wahlig | 313—108 |
| 3,052,810 | 9/1962 | Mash | 313—112 X |
| 3,405,276 | 10/1968 | Szepesi | 313—108 |

FOREIGN PATENTS 909,342 10/1962 Great Britain.

ROBERT SEGAL, Primary Examiner

D. O'REILLY, Assistant Examiner

U.S. Cl. X.R.

313—109.5